United States Patent
Kim (10) Patent No.: US 8,984,007 B2
(45) Date of Patent: Mar. 17, 2015

(54) METHOD AND APPARATUS USING A HIERACHICAL SEARCHING SCHEME AMONG VIRTUAL PRIVATE COMMUNITIES

(75) Inventor: Jaehoon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 13/198,883

(22) Filed: Aug. 5, 2011

(65) Prior Publication Data

US 2012/0036114 A1    Feb. 9, 2012

(30) Foreign Application Priority Data

Aug. 6, 2010  (KR) .................. 10-2010-0076052

(51) Int. Cl.
*G06F 17/30*   (2006.01)
*G06Q 10/10*   (2012.01)

(52) U.S. Cl.
CPC ..................................... *G06Q 10/10* (2013.01)
USPC ........... 707/781; 707/687; 707/696; 707/703; 707/722; 707/758

(58) Field of Classification Search
CPC ................................................ G06F 17/30283
USPC .......... 707/687, 696, 703, 713, 722, 758, 781
See application file for complete search history.

(56) References Cited

U.S. PATENT DOCUMENTS

| | | | |
|---|---|---|---|
| 2003/0055898 | A1 | 3/2003 | Yeager et al. |
| 2009/0299818 | A1* | 12/2009 | Heinze et al. ............ 705/10 |
| 2009/0300521 | A1* | 12/2009 | Jerrard-Dunne et al. ..... 715/757 |

FOREIGN PATENT DOCUMENTS

| | | |
|---|---|---|
| JP | 2008-108096 | 5/2008 |
| KR | 10-2005-0090923 | 9/2005 |
| KR | 10-2006-0070242 | 6/2006 |

* cited by examiner

*Primary Examiner* — Sana Al Hashemi
(74) *Attorney, Agent, or Firm* — NSIP Law (57) ABSTRACT

Provided is a member or content search method in a virtual private community (VPC) network including at least one of a first VPC including communication devices owned by a predetermined user, a second VPC that may be positioned in an upper layer of the first VPC, and a third VPC that may be positioned in an upper layer of the second VPC, the method including receiving, by one of the communication devices, a search request comprising one of VPC identifiers of a user, verifying a VPC corresponding to the VPC identifiers that may be included in the search request, in response to the search request, and searching for members included in the verified VPC, a VPC positioned in a lower layer of the verified VPC, or contents owned by the members included in the verified VPC.

11 Claims, 9 Drawing Sheets

FIG. 9

METHOD AND APPARATUS USING A HIERACHICAL SEARCHING SCHEME AMONG VIRTUAL PRIVATE COMMUNITIES

CROSS-REFERENCE TO RELATED APPLICATION(S)

This application claims the benefit under 35 U.S.C. §119(a) of Korean Patent Application No. 10-2010-0076052, filed on Aug. 6, 2010, in the Korean Intellectual Property Office, the entire disclosure of which is incorporated herein by reference for all purposes.

BACKGROUND

1. Field

The following description relates to technology for searching for members included in each virtual private community (VPC), or contents owned by the members of VPCs.

2. Description of Related Art

Applications and communication devices may provide a social network service, and the like. The social network service may provide a community type website enabling each user to make more friends or form personal connections, and may share various pieces of information with other users through the social network community type website.

Here, in general, a server may be used to provide the social network service, and the users may use the social network service via the server.

SUMMARY

In one general aspect, there is provided a system that includes a member or contents search method in a virtual private community (VPC) network including at least one of a first VPC including communication devices owned by a predetermined user, a second VPC that may be positioned in an upper layer of the first VPC, and a third VPC that may be positioned in an upper layer of the second VPC, the method including receiving, by one of the communication devices, a search request including one of VPC identifiers from a user, verifying a VPC corresponding to the VPC identifiers that may be included in the search request, in response to the search request, and searching for members included in the verified VPC, a VPC positioned in a lower layer of the verified VPC, or contents owned by the members included in the verified VPC, and the VPC identifiers of the VPCs may indicate a hierarchical structure among the VPCs.

The method may further include responding to the search request by incorporating the search result into the search request.

The method may further include responding to the search request by incorporating a portion of the VPC identifiers of the second VPC into the search request, and the receiving may include receiving a search request including VPC identifiers of the third VPC, the verifying may include verifying the third VPC, and the searching may include searching for the second VPC among the first VPC and the second VPC positioned in a lower layer of the third VPC.

The method may further include responding to the search request by incorporating a portion of the VPC identifiers of the first VPC into the search request, and the receiving may include receiving a search request including VPC identifiers of the second VPC, the verifying may include verifying the second VPC, and the searching may include searching for the first VPC that is positioned in a lower layer of the second VPC.

The method may further include responding to the search request by incorporating a list of the contents owned by communication devices included in the first VPC into the search request, and the receiving may include receiving a search request including VPC identifiers of the first VPC, the verifying may include verifying the first VPC, and the searching include searching for the communication devices included in the first VPC.

A hierarchical content name of the contents owned by the communication devices may include VPC identifiers of the first VPC, and a name of the contents owned by the communication devices.

Members of the second VPC may share a content sharing service or a social networking service.

Members of the third VPC may perform an association using a predetermined communication device, and may share information about each of a plurality of second VPCs.

The receiving may include receiving, by at least one of the communication devices, a search request including one of the VPC identifiers, and information about scope of a search.

The verifying may include verifying one of the first VPC, the second VPC, and the third VPC based on the information about the scope of a search.

In another general aspect, there is provided a communication device in a VPC network including at least one of a first VPC including communication devices owned by a predetermined user, a second VPC that may be positioned in an upper layer of the first VPC, and a third VPC that may be positioned in an upper layer of the second VPC, the communication device including a memory to store VPC identifiers of the VPCs, indicating a hierarchical structure among the VPCs, an interface to receive a search request including one of the VPC identifiers, and a processor to verify a VPC corresponding to the VPC identifiers that may be included in the search request, in response to the search request, and to search for members included in the verified VPC, a VPC positioned in a lower layer of the verified VPC, or contents owned by the members included in the verified VPC.

Other features and aspects may be apparent from the following detailed description, the drawings, and the claims.

BRIEF DESCRIPTION OF THE DRAWINGS

Throughout the drawings and the detailed description, unless otherwise described, like drawing reference numerals will be understood to refer to like elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Figure 1:
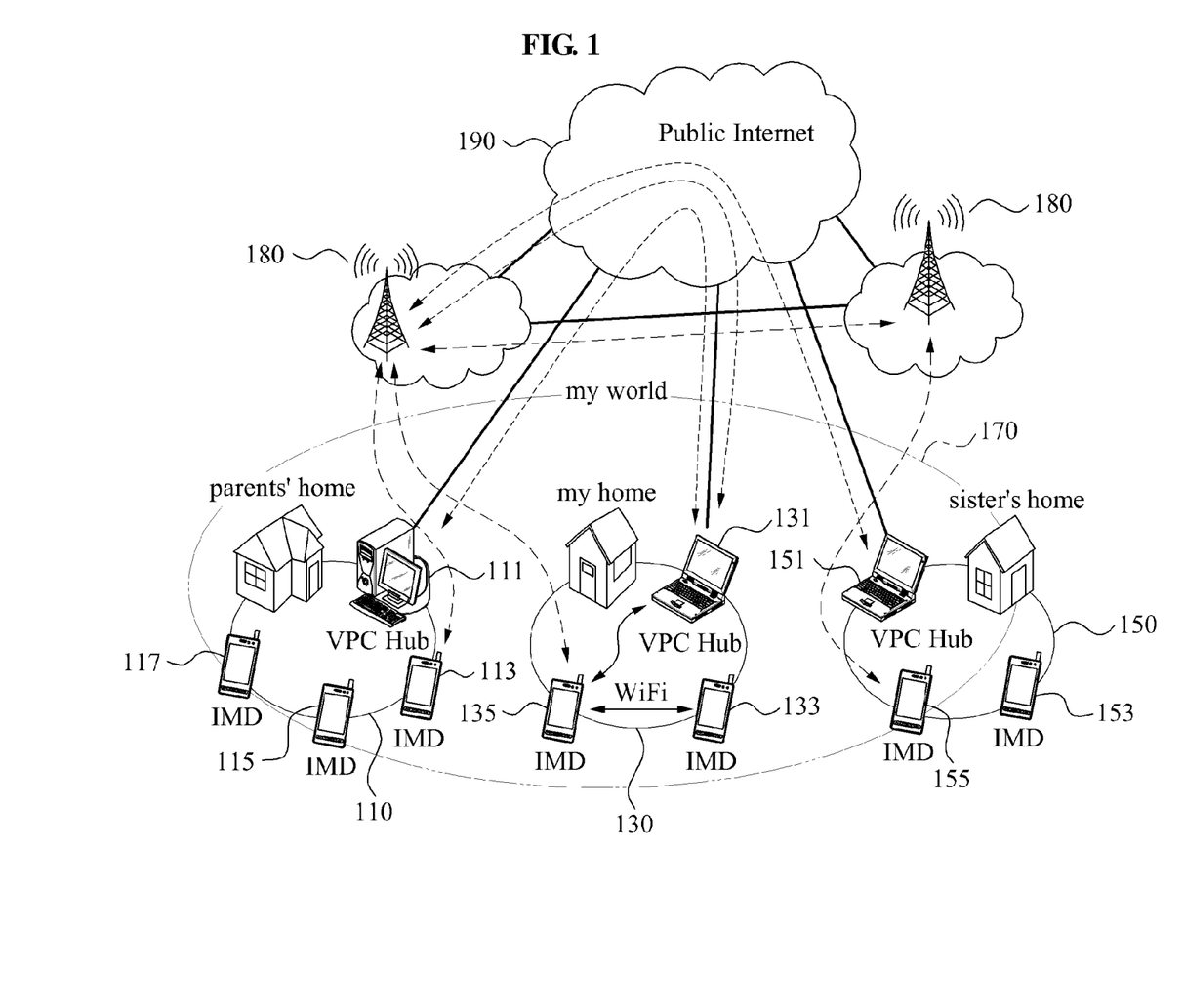
FIG. 1 is a diagram illustrating an example of a network of user-oriented virtual private communities (VPCs).

FIG. 1 illustrates an example of a network of user-oriented virtual private communities (VPCs).

Referring to FIG. 1, the network of the user-oriented VPCs includes a plurality of second VPCs 110, 130, and 150, a third VPC 170, a mobile operator 180, and the Internet 190.

The user-oriented VPC may correspond to a virtual community for acquiring contents desired by a user in the VPC, by generating and transmitting a content request message that may express an interest of a user in the content.

The user-oriented VPC may enable various services to be shared between acquaintances by supporting the generation of VPCs so that an offline relationship between family members and relatives may be well maintained in an online environment.

The VPC may correspond to an online community generated in a user-oriented manner. That is, the VPC may be generated without being limited by infrastructural boundaries, and may provide a service regardless of the boundaries. As an example, the VPC may include various types of communities that may be hierarchical or non-hierarchical, that is, horizontal.

According to example embodiments, the user-oriented VPC may be provided with the contents desired by the user in the VPC, thereby being provided with a sharing service and a social networking service more effectively, in a user-friendly manner, and without a risk of personal information being leaked.

All information shared among users, for example, members of the user-oriented VPC may be shared only between the members of the community. Thus, the personal information of the users, for example, the members of the VPC may be prevented from being inadvertently leaked by the service provider, hacking with respect to an external server, or the like.

According to example embodiments, the VPC may correspond to a virtual community formed in a user-oriented manner, instead of a manner independent of the service provider, and may be generated in a form of a distributed structure.

The VPC may be classified into a first VPC (not shown), the second VPCs 110, 130, and 150, the third VPC 170, and the like based on a size of the community and a characteristic of the community.

The first VPC may correspond to a community for a predetermined single user, which corresponds to a fundamental unit of the community, and may perform server-less and self-secure association between personal communication devices. Here, self-secure indicates that a communication device securely communicates with another communication device via an encrypted link established directly between the two communication devices without using a third party. Referring to FIG. 1, communication devices 113, 115, and 117 of predetermined users may form the first VPC.

The members of the first VPC may correspond to personal communication devices or various devices having a network function, and may include, for example, a personal computer (PC), a laptop computer, a personal digital assistant (PDA), a mobile device, a sensor device, and the like.

In particular, the sensor device included as a member of the first VPC may be combined with more advanced security technology to be applied to an e-health system and a smart home.

As aforementioned, the first VPC may include at least one communication device for a predetermined single user, and the at least one communication device for the predetermined user may correspond to a single member of the first VPC.

For example, it may be assumed that among communication devices in parents' home of FIG. 1, a communication device 111 is a desktop computer owned by a father, the communication device 113 is a communication device owned by the father, the communication device 115 is a PDA owned by a mother, and the communication device 117 is a communication device owned by the mother.

In this case, the first VPC may be generated by the communication devices 111 and 113 of a predetermined user corresponding to the father, and another first VPC may be generated by the communication devices 115 and 117 of another predetermined user corresponding to the mother.

The communication devices 111 and 113 for the father included in the first VPC may perform a self-secure association between them.

The communication devices 115 and 117 for the mother in the other first VPC may also perform the self-secure association between the communication devices 115 and 117, similar to the communication devices 111 and 113.

The second VPCs 110, 130, and 150 may correspond to higher order communities of the first VPC, and may share a content sharing service or a social networking service.

The second VPC 110 includes a hub corresponding to the communication device 111, and the communication devices 113, 115, and 117.

The second VPC 130 may include a hub corresponding to a communication device 131, and communication devices 133 and 135, and the second VPC 150 may include a hub corresponding to a communication device 151, and communication devices 153 and 155.

Here, predetermined communication devices, for example, the communication devices 111, 131, and 151, which are included in parents' home, my home, and sister's home, may respectively correspond to a communication device of the first VPC, and also may operate as a hub of the second VPC. Further descriptions will be made hereinafter.

The second VPCs 110, 130, and 150 may include a scale corresponding to a home unit, such as parents' home, my home, and sister's home as illustrated in FIG. 1. As an example, a home unit community may be classified based on a particular aspect of a scale, however, a region of the second VPCs 110, 130, and 150 is not limited to a home.

Members of the second VPCs 110, 130, and 150 may include a predetermined user of the first VPC and users authorized by the predetermined user.

For example, in the case of parents' home, the father and mother having at least one communication device for a predetermined user may be members of the second VPC.

In my home, it may be assumed that communication devices 131 and 133 owned by me correspond to a laptop computer and a smart phone respectively, and a communication device 135 owned by my spouse corresponds to a smart phone.

In this instance, the communication devices 131 and 133 owned by me may correspond to members of the first VPC, and the communication device 135 of my spouse may correspond to a member of the another first VPC. Also, my spouse and me may correspond to members of the second VPC.

My spouse may correspond to a user authorized by me, as a member of the second VPC.

The third VPC 170 may correspond to a highest order community generated by performing a mutual association by the plurality of second VPCs 110, 130, and 150, and may have a scale corresponding to, for example, "my world" of FIG. 1.

The third VPC 170 may correspond to a higher order community of the plurality of second VPCs 110, 130, and 150, and members of the third VPC 170 may perform an association through predetermined communication devices, for example, the communication devices 111, 131, and 151 corresponding to hubs.

Also, information about each of the plurality of second VPCs 110, 130, and 150 corresponding to the members of the third VPC 170 may be exchanged or shared through the predetermined communication devices, for example, the communication devices 111, 131, and 151 corresponding to the hubs.

Here, the information about each of the plurality of second VPCs 110, 130, and 150 may include information about each of the members of the second VPC, and information about contents included in the members of the second VPC.

The VPC may be easily extended to a wider hierarchical or non-hierarchical VPC such as a fourth VPC, a fifth VPC, and the like according to a desire of a user, for example, a member of the community, to extend a scope of the community.

Figure 2:
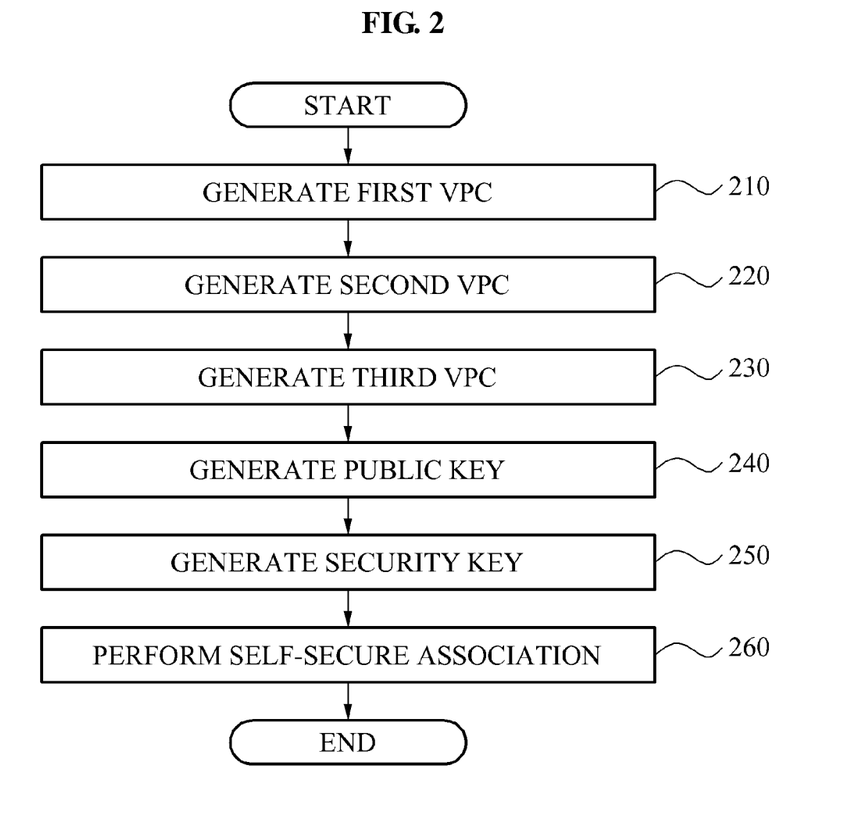
FIG. 2 is a flowchart illustrating an example of a method of generating a user-oriented VPC.

FIG. 2 illustrates an example of a method of generating a user-oriented VPC.

Referring to FIG. 2, a first VPC for a predetermined user, including at least one communication device of the predetermined user is generated in 210.

Here, the at least one communication device included in the first VPC may generate a hierarchical content name, using a virtual community identifier of the first VPC and a content name included in the at least one communication device.

The hierarchical content name may hierarchically include the virtual community identifier of the first VPC and the content name included in the at least one communication device.

For example, it may be assumed that the virtual community identifier of the first VPC corresponds to "Jones", the at least one communication device included in the first VPC corresponds to a cell phone, a laptop computer, and a PDA, and the cell phone includes a content "abc.mpeg".

In this case, the cell phone included in the first VPC may generate a hierarchical content name "Jones/cell phone/abc.mpeg", using the virtual community identifier "Jones" of the first VPC and the content name "abc.mpeg" included in the cell phone.

As aforementioned, the at least one communication device included in each of the VPCs according to example embodiments may generate a virtual community identifier using community information of the communication device, for example, a name of the community, or member information, for example, a name of the member, and the like, and may generate a hierarchical content name using a virtual community identifier and a content name.

In 220, a second VPC corresponding to a higher order community of the first VPC is generated.

In this instance, members of the second VPC may share a content sharing service or social networking service, and may include a predetermined user, and users authorized by the predetermined user.

In 230, a third VPC corresponding to a higher order community of a plurality of second VPCs is generated.

Members of the third VPC may perform an association through a predetermined communication device, for example, a hub, and may share information about each of the plurality of second VPCs.

For example, each of the first VPC, the second VPC, and the third VPC may have an inherited virtual community identifier indicating a hierarchical structure of the first VPC, the second VPC, and the third VPC.

Here, the at least one communication device of the first VPC may generate the hierarchical content name using the content name including the virtual community identifier of each of the first VPC, the second VPC, and the third VPC.

That is, when the content is generated, members of each VPC may generate a hierarchical content name including community information, member information, and the like, such as "(virtual private) community name/member name/content name" or "(virtual private) community name/member name/name of at least one communication device of the member/content name."

The name of each community, the member name, and the content name expressed in the hierarchical content name may have a form of, for example, "parents home/Jones (name of a father corresponding to the member)/abc.txt," and a hierarchical structure indicated in the hierarchical content name may be used for configuring a transmission path of a content request message.

The VPC according to example embodiments may be expressed using an intuitive and user-friendly virtual community identifier, for example, "my home" or "my world" of FIG. 1, and the members of each VPC may have an inherited virtual community identifier indicating the hierarchical structure reflecting a structure of the VPC.

That is, each VPC may more easily generate a routing path of the content request message and the transmission path of the contents, using the inherited virtual community identifier indicating the hierarchical structure.

When generating the routing of the content request message and the transmission path of the content, the VPC may exchange information about the VPC along with the virtual community identifier of each VPC.

Here, the information about the VPC may include, for example, information about the member of the VPC, a content list, or the like.

When the content is generated, the members of each VPC may also generate a hierarchical content name including community information and member information used as the virtual community identifier.

Here, the hierarchical content name may include the community information, member information, and content information such as "community name/member name/content name" or "community name/member name/name of at least one communication device of the member/content name", and may be expressed as, for example, "alice_world/alice_home/alice/wild.jpg".

In this instance, "alice_world" may correspond to a name of a highest order VPC, that is, the third VPC, "alice_home" may correspond to a name of a second highest order VPC, that is, the second VPC, "alice" may correspond to a name of a most elementary unit of a VPC, that is, the first VPC or a communication device, and "wild.jpg" may correspond to a content name included in the most elementary unit of VPC or the communication device.

In 240, the at least one communication device included in the first VPC, the second VPC, and the third VPC generates a public key for each of the first VPC, the second VPC, and the third VPC.

In 250, the at least one communication device generates a security key for each of the first VPC, the second VPC, and the third VPC, based on the generated public key.

In 260, the member or the at least one communication device included in the first VPC, the second VPC, and the third VPC performs a self-secure association between the members or the at least one communication device, using the generated security key.

Here, the at least one communication device of the first VPC may generate a hierarchical content name using the virtual community identifier of each of the first VPC, the second VPC, and the third VPC, as aforementioned.

The hierarchical content name may hierarchically indicate the virtual community identifier of each of the first VPC, the second VPC, and the third VPC.

A new member or a new communication device joining one of the first VPC, the second VPC, and the third VPC may perform an association with a single member among the members of the first VPC, the second VPC, and the third VPC, using credentials of each of the first VPC, the second VPC, and the third VPC.

Figure 3:
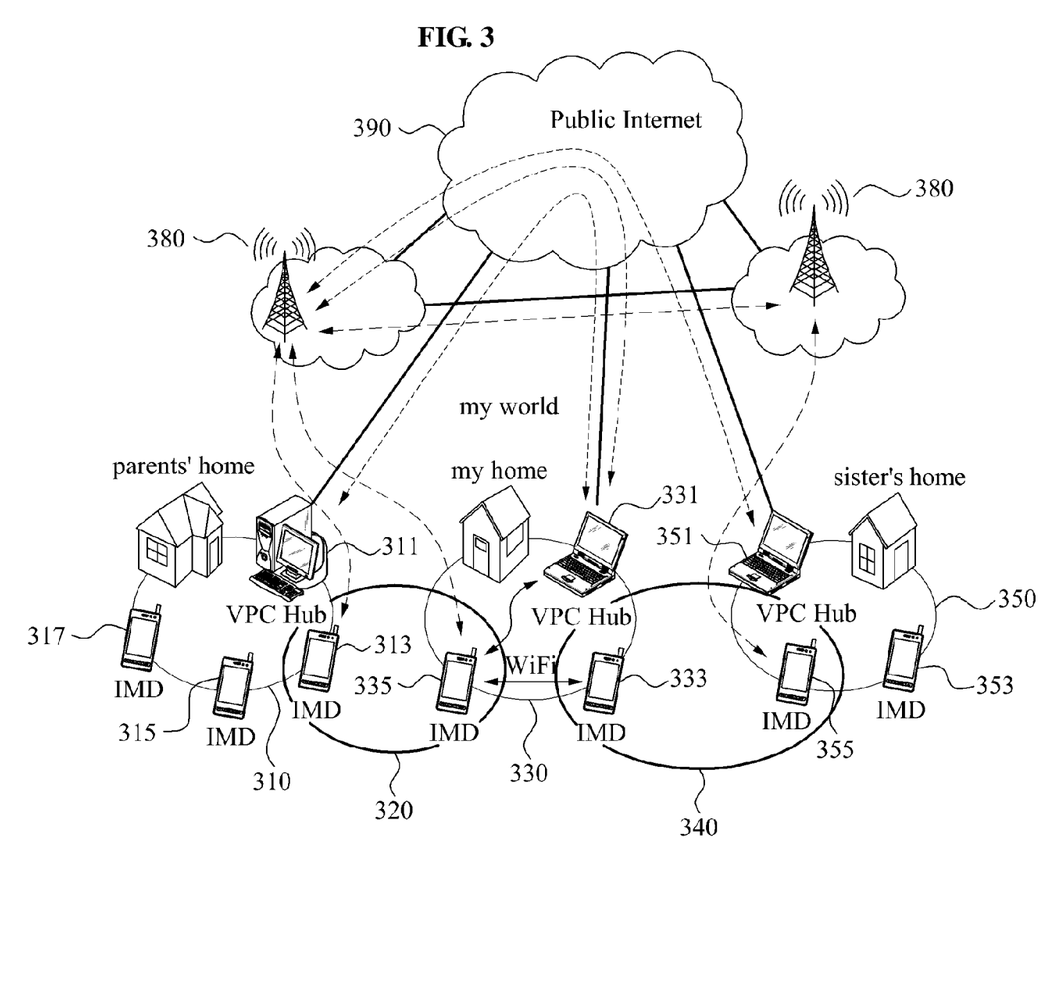
FIG. 3 is a diagram illustrating an example in which a member of a second VPC may form a new VPC in concert with a member of another second VPC, in a VPC.

FIG. 3 illustrates an example in which a member of a second VPC may form a new VPC in concert with a member of another second VPC, in a VPC.

Referring to FIG. 3, a network of a user-oriented VPC includes a plurality of second VPCs 310, 330, and 350, a third VPC 370, a mobile operator 380, and the Internet 390.

Although not illustrated, VPC A and VPC B may refer to the second VPC 310 and the second VPC 330 in the following example.

A second VPC A, for example, the second VPC 310 includes a hub 311 and communication devices 313, 315, and 317.

Another second VPC B, for example, the second VPC 330 includes a hub 331 and communication devices 333 and 335, and the other second VPC B, for example, the second VPC 350 includes a hub 351 and communication devices 353 and 355.

In a method of generating the user-oriented VPC according to example embodiments, another plurality of VPCs independent of a boundary of a basic VPC may be formed.

Here, it may be assumed that the communication device 313 included in the second VPC A, for example, the second VPC 310 and the communication device 335 included in the second VPC B, for example, the second VPC 330 perform an association with each other beyond a boundary of the second VPC A and the second VPC B in which the communication device 313 and the communication device 335, respectively, may be originally included in, and thereby generate another new VPC, for example, a fourth VPC 320.

A predetermined user, for example, the communication device 313 of the second VPC A, for example, the second VPC 310 may generate the new fourth VPC 320 with a member, for example, the communication device 335 of the second VPC B, for example, the second VPC 330, among members of the plurality of second VPCs 310, 330, and 350.

Here, the new fourth VPC 320 may be independent of a boundary of the existing second VPC or third VPC, and may correspond to a non-hierarchical VPC.

That is, members of the new fourth VPC 320 may generate and exchange a public key for the new fourth VPC 320, and may generate a security key for the new fourth VPC 320, using the generated public key for the new fourth VPC 320.

New VPCs independent of the plurality of second VPCs such as the new fourth VPC 320 and another new fourth VPC 340 of FIG. 3 may provide a separate access control and security setting that may conform to characteristics of the newly generated VPCs.

That is, the new fourth VPC 320 or the other new fourth VPC 340 may provide a limited access control and security setting only for the new fourth VPC 320 or 340.

For example, it may be assumed that the communication device 333 of the second VPC B, for example, the second VPC 330 corresponds to a communication device owned by my son in "my home", and the communication device 355 of the second VPC C, for example, the second VPC 350 corresponds to a communication device owned by a son of my sister, that is, a nephew in "my sister's home."

My teenage son and the teenage son of my sister may desire to share confidential information being kept from other family members, and may form a new VPC different from the existing second VPCs.

In this instance, the new VPC may prevent other members from accessing the new VPC and may maintain security, using a separate public key and a separate security key, so that only members of the corresponding VPC may access the corresponding VPC.

As aforementioned, the new VPCs may be generated within the second VPC, and may be generated beyond the boundary of the third VPC.

That is, the new VPCs may be generated in a form of a hierarchical or non-hierarchical community, and security key management technology based on a distributed structure may be used to form various forms of communities.

As to the security key management technology based on the distributed structure, the aforementioned description related to the security key generated using the public key for each VPC will be referenced.

Figure 4:
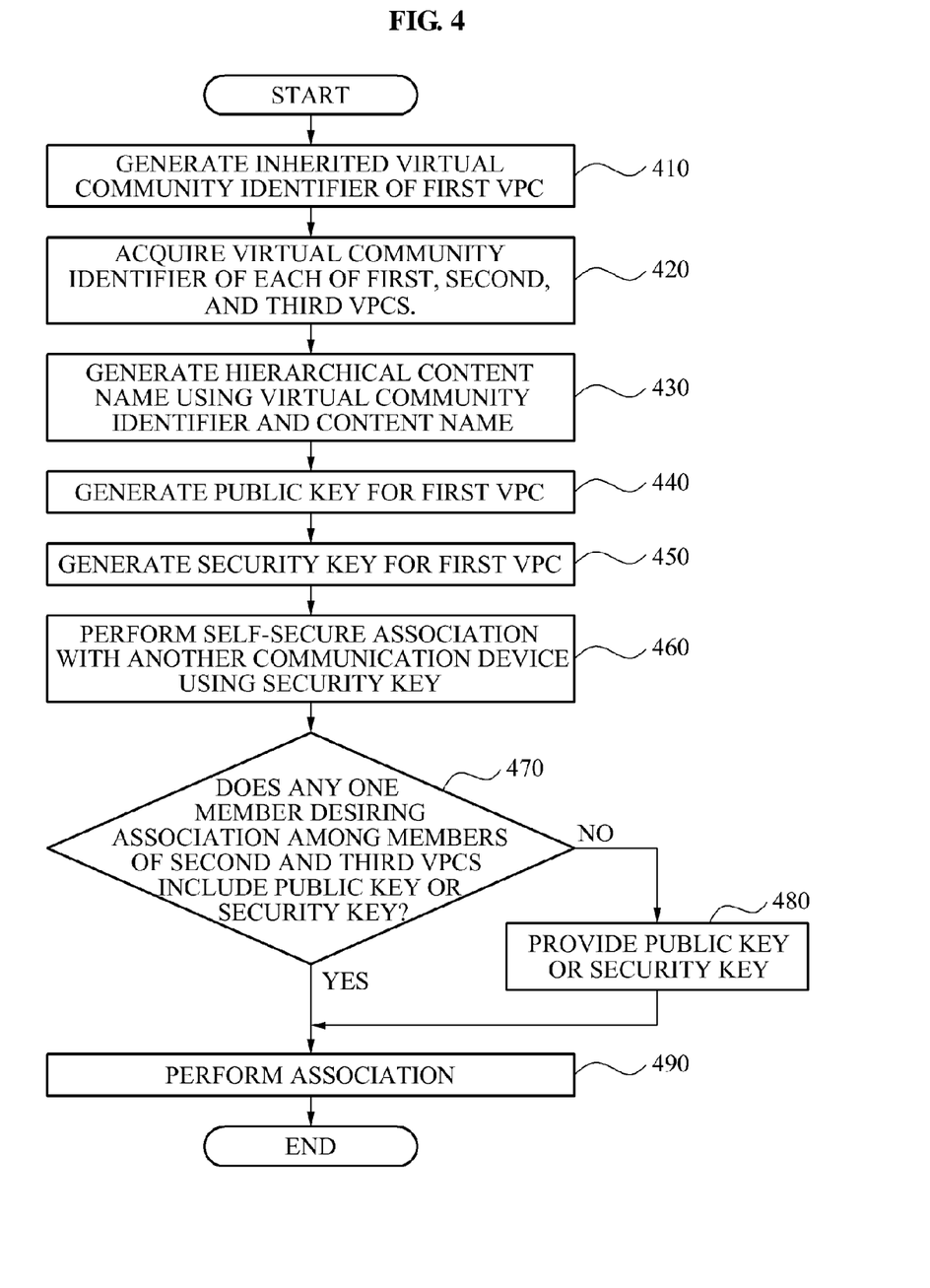
FIG. 4 is a flowchart illustrating an example of an operating method of a communication device in a VPC.

FIG. 4 illustrates an example of an operating method of a communication device in a VPC.

The communication device in the VPC may acquire a virtual community identifier of a first VPC from at least one communication device included in the first VPC, and may generate a hierarchical content name using the virtual community identifier of the first VPC and a content name included in the at least one communication device.

Here, the VPC may include the first VPC for a predetermined user, including the at least one communication device of the predetermined user.

The hierarchical content name may hierarchically include the virtual community identifier of the first VPC, and the content name included in the at least one communication device included in the first VPC.

The communication device in the VPC may generate a public key for the first VPC, and may generate a security key of the first VPC based on the generated public key. Also, the communication device may perform a self-secure association with another communication device of the first VPC, using the generated security key. The self-secure association performed by the communication device with the another communication device will be further described with reference to following FIG. 5.

In addition, the VPC may further include a second VPC as a higher order community of the first VPC, a third VPC as a higher order community of a plurality of second VPCs, and the like.

Members of the second VPC may share a content sharing service or social networking service, and members of the third VPC may perform an association through a predetermined communication device, and may share information about each of the plurality of second VPCs.

As aforementioned, when the VPC includes the second VPC, the communication device in the VPC may acquire a virtual community identifier of each of the first VPC and the second VPC from at least one communication device included in each of the first VPC and the second VPC, and may generate a hierarchical content name using a content name and the virtual community identifier of each of the first VPC and the second VPC.

The hierarchical content name may hierarchically include the virtual community identifier and the content name of each of the first VPC and the second VPC.

When the VPC includes the third VPC, the communication device in the VPC may acquire a virtual community identifier of each of the first VPC, the second VPC, and the third VPC from at least one communication device included in each of the first VPC, the second VPC, and the third VPC, and may generate a hierarchical content name using a content name and the virtual community identifier of each of the first VPC, the second VPC, and the third VPC.

When the VPC includes the second VPC, the hierarchical content name may hierarchically include a virtual community identifier of each of the first VPC, the second VPC, and the third VPC.

An operating method of the communication device in the VPC when the VPC includes the first VPC, second VPC, and third VPC as aforementioned will be hereinafter described.

Referring to FIG. 4, the communication device in the VPC generates an inherited virtual community identifier of the first VPC, hierarchically including the virtual community identifier of the first VPC acquired from the at least one communication device included in the first VPC, and the content name included in the first VPC, in 410.

Here, the VPC may include the first VPC for a predetermined user, a second VPC as a higher order community of the first VPC, and a third VPC as a higher order community of a plurality of second VPCs.

Here, the first VPC may include, as a member, the at least one communication device of the predetermined user, and members of the second VPC may share a content sharing service or social networking service.

Members of the third VPC may perform an association through a predetermined communication device, and may share information about each of the plurality of second VPCs.

In 420, the communication device in the VPC acquires a virtual community identifier for each of the first VPC, the second VPC, and the third VPC from the at least one communication device included in each of the first VPC, the second VPC, and the third VPC.

Prior to 420, the at least one communication device included in the first VPC may generate the hierarchical content name using the virtual community identifier and the content name of each of the first VPC, the second VPC, and the third VPC.

In 430, the communication device generates the hierarchical content name using the virtual community identifier and the content name of each of the first VPC, the second VPC, and the third VPC.

In this instance, the hierarchical content name may hierarchically indicate the virtual community identifier of each of the first VPC, the second VPC, and the third VPC.

In 440, the communication device generates a public key for the first VPC. In 450, the communication device generates a security key of the first VPC based on the generated public key.

In 460, the communication device performs a self-secure association with another communication device of the first VPC, using the generated security key.

In 470, the communication device determines whether a member desiring association with the other communication device, among members of the plurality of VPCs corresponding to higher order communities of the first VPC and the third VPC corresponding to a higher order community of the plurality of second VPCs, includes the public key or the security key for the first VPC.

When a member desiring association with the other communication, among the members of the second VPCs and the third VPC device, includes the public key or security key as a determination result of 470, the communication device performs the association with the member using the public key or the security key, in 490.

However, when a member among the members of the second VPCs and the third VPC does not include the public key or the security key in 470, the communication device provides the public key or the security key of the first VPC to the member in 480, and thereby enables the association to be performed in 490.

Figure 5:
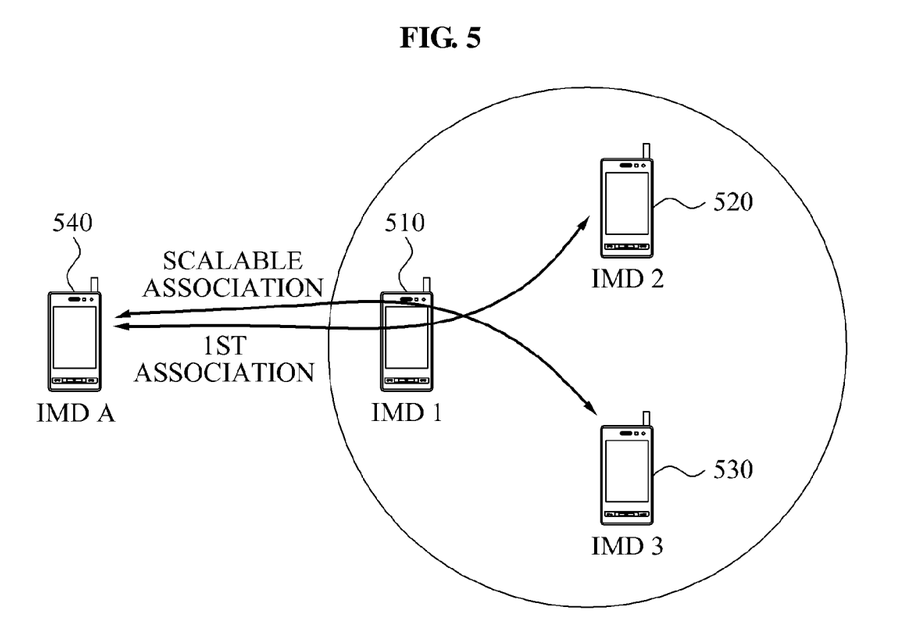
FIG. 5 is a diagram illustrating an example of a self-secure association.

FIG. 5 illustrates an example of a self-secure association.

Referring to FIG. 5, a new member joining a predetermined community may perform an association with all members included in the community.

However, according to example embodiments, a communication device may not perform an association with all members in a predetermined VPC when the communication device newly joins the VPC.

For example, a communication device 540 newly joining a VPC performs an association with a single predetermined member in the VPC, thereby automatically performing an association with all members in the VPC, which will be referred to as an auto and scalable association.

A communication device of an inviter (hereinafter, 'owner') who first forms a community in the VPC may generate a public key for the VPC in which the owner may be included.

For example, it may be assumed that a communication device 510 corresponds to an owner, and communication devices 520 and 530 correspond to communication devices of other members of the second VPC.

The owner 510 may share a public key for recognizing the owner, with at least one communication device of the other members so that members of the second VPC in which the owner 510 may be included so as to be recognized.

As a method of sharing the public key, a case in which the owner transmits, via an authorized channel, the public key for recognizing the owner to the at least one communication device of the other members may be given as an example.

The at least one communication device of the other members may verify, using the public key, whether information transferred to the at least one communication device corresponds to information transferred from a correct owner, that is, the owner of the second VPC in which the at least one communication device may be included.

Also, the at least one communication device of the other members may verify, using the public key, whether a signature of the corresponding information corresponds to a signature of the owner.

When the public key of the owner 510 is shared, the at least one communication device may automatically verify whether the at least one communication device corresponds to a member of the second VPC.

According to example embodiments, all members of a predetermined VPC may be linked with the owner using the public key. Thus, a member newly joining the VPC, for example, a communication device 540 may perform a single association with the owner, thereby automatically performing the association with the other members in the same VPC.

That is, the member newly joining the VPC, for example, the communication device 540 may perform the single association with the owner, thereby being automatically associated with all members without performing an association with each respective member in the community.

Also, the member newly joining the VPC, for example, the communication device 540 may automatically perform the association with other members in the VPC in addition to the owner.

The other members in the VPC may be linked to a credential of the owner, and accordingly an effect analogous to performing the association directly with the owner may be achieved without performing the association with the owner directly.

When the association between the owner and the at least one communication device of the VPC is performed, the owner and the at least one communication device may provide, among the members, information about members of the VPC, a hierarchical content name, a virtual community identifier, and the like included in each of the owner and the at least one communication device.

The aforementioned information may be used for an automatic association between an owner and other members, and a future content routing between VPCs.

Figure 6:
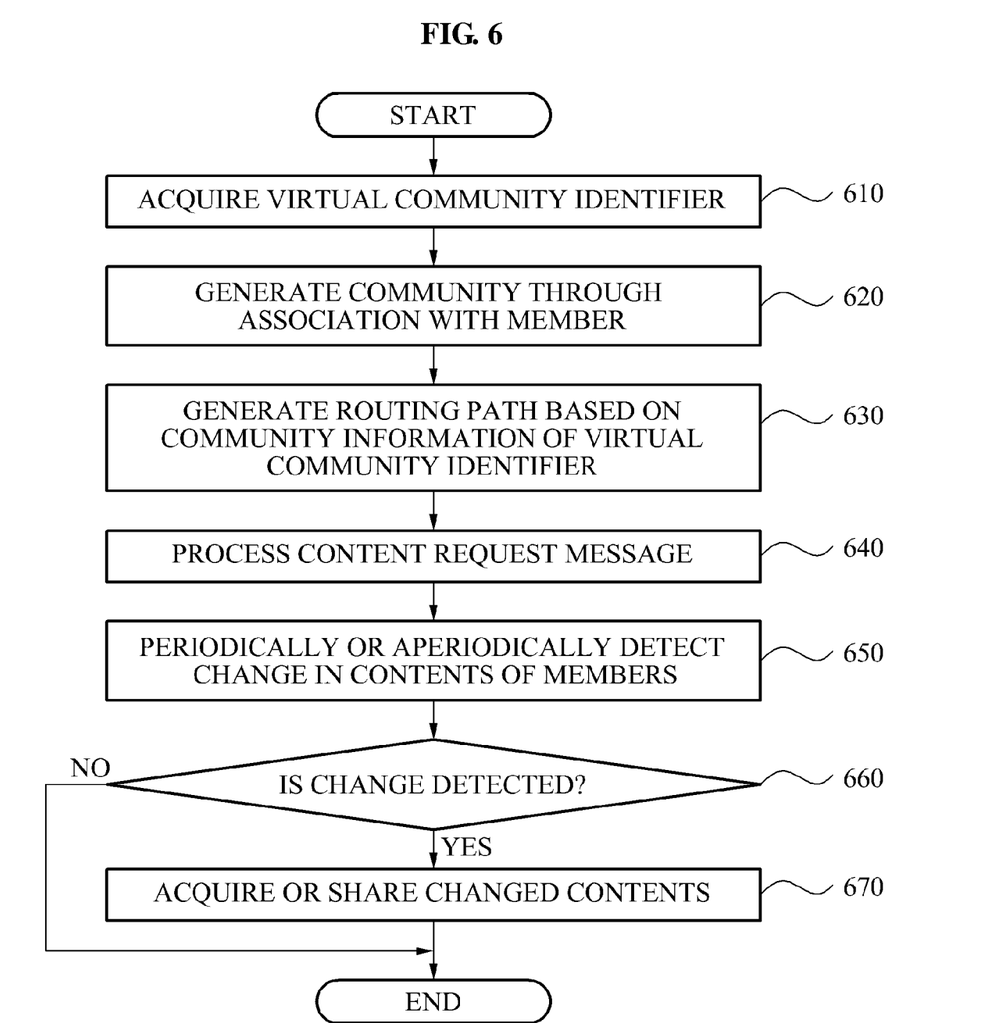
FIG. 6 is a flowchart illustrating an example of an operating method of a hub for a communication device in a VPC.

FIG. 6 illustrates an example of an operating method of a hub for a communication device in a VPC.

Referring to FIG. 6, in 610, the hub acquires a virtual community identifier of each of a first VPC and a second VPC, in the VPC.

Here, the VPC may include the first VPC for a predetermined user, including at least one communication device of the predetermined user, and the second VPC corresponding to a higher order community of the first VPC.

Members of the second VPC may share a content sharing service or social networking service.

In the home unit VPC described with reference to FIG. 3, the hub may perform forming of a VPC, managing members, managing contents of a member, and the like.

The hub may transmit, via an authorized channel, a public key for enabling the members of the second VPC to recognize the hub to members of the second VPC.

The hub for a communication device in the VPC may correspond to a predetermined communication device in the VPC, as opposed to a separate device.

In this instance, the hub may correspond to a communication device that is generally connected to a broadband network, and constantly operates in a power-on state.

Members included in the VPC may effectively communicate with an external source through the hub, and may also communicate with the external source instead of relying on the hub.

In 620, the hub generates the VPC through an association with the communication device, that is, a member having contents, using the virtual community identifier of each of the first VPC and the second VPC.

In 630, the hub generates a routing path between a communication device including the contents and a communication device requesting the contents, using community information included in the virtual community identifier.

According to example embodiments, the hub may perform a role as a router in the VPC and thus, at least one communication device in the VPC may more easily exchange routing information, and the like through the hub.

The hub may perform tunneling between the second VPC and another plurality of second VPCs so that the members of the second VPC may perform communication with members of the other plurality of second VPCs.

That is, the hub may provide the tunneling with a communication device outside of a local connection area of the VPC in which the hub may be included, thereby configuring a communication environment between members of the VPC in which the hub may be included and members of other plurality of VPCs.

The hub may also perform forming a VPC, managing members, managing contents of a member, and the like.

In 640, the hub processes a content request message from the communication device or members included in each VPC, using the virtual community identifier of each of the first VPC and the second VPC.

Also, the hub generates a routing path between the communication device including the contents and the communication device requesting the contents, using the virtual community identifier of each of the first VPC and the second VPC, and processes the a content request message through the routing path.

In 650, the hub periodically or aperiodically detects a change in the contents included in the members of the second VPC.

When a change in the contents included in the members of the second VPC is detected in 660, the hub either acquires the changed contents, or enables the members of the second VPC to share the changed contents in 670.

Conversely, when a change in the contents is not detected in 660, the hub does not perform any particular operation.

The hub may manage information about the members of the second VPC, and information about the contents included in the members of the second VPC.

Also, the hub may exchange at least one piece of communication environment information with other VPCs outside of the second VPC in order to perform communication with the other VPCs.

In this instance, the at least one piece of communication environment information may include information about a name of a VPC, a virtual community identifier, contents included in a VPC, and the like.

In addition, the hub may perform at least one of synchronization, push, and a content search, with the members of the second VPC.

The VPC may further include a third VPC corresponding to a higher order community of the plurality of second VPCs.

In this instance, members of the third VPC may perform an association through a predetermined communication device, and may share information about each of the plurality of second VPCs.

When the VPC includes the third VPC, the hub may acquire the virtual community identifier of each of the first VPC, the second VPC, and the third VPC, and may process a content request message from communication devices or members included in each VPC using the virtual community identifier of each of the first VPC, the second VPC, and the third VPC.

In order to process the content request message, the hub may perform an association with the communication device including the contents, using the virtual private identifier of each of the first VPC, the second VPC, and the third VPC.

Also, the hub may generate a routing path between the communication device including the contents and a communication device requesting the contents, using the virtual community identifier of each of the first VPC, the second VPC, and the third VPC.

As aforementioned, a VPC network may include at least one communication device and at least one hub.

The at least one communication device may generate a hierarchical content name using a content name and an inherited virtual community identifier indicating a hierarchical structure of a first VPC, a second VPC, and a third VPC, acquired from the at least one communication device included in the first VPC for a predetermined user, including at least one communication device, and the second VPC corresponding to a higher order community of the first VPC.

That is, the at least one hub may process a content request message from the at least one communication device using the hierarchical content name.

Figure 7:
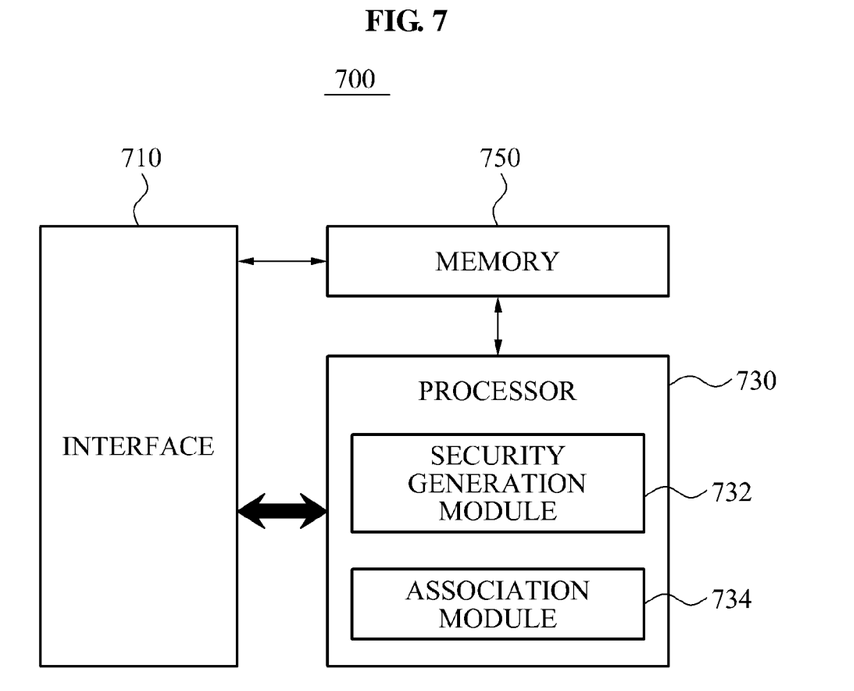
FIG. 7 is a block diagram illustrating an example of a communication device in a VPC.

FIG. 7 illustrates an example of a communication device 700 in a VPC.

Referring to FIG. 7, the communication device 700 in the VPC includes an interface 710, a processor 730, and a memory 750.

The VPC may include a first VPC for a predetermined user, including at least one communication device of the predetermined user.

The interface 710 may receive an inherited virtual community identifier indicating a hierarchical structure of each VPC acquired from the at least one communication device included in the first VPC.

The processor 730 may generate a hierarchical content name using a virtual community identifier of the first VPC, and a content name included in the at least one communication device.

The memory 750 may store the virtual community identifier and the hierarchical content name.

The VPC may further include a second VPC corresponding to a higher community of the first VPC. In this instance, members of the second VPC may share a content sharing service or social networking service.

When the VPC includes the second VPC, the interface 710 may receive the inherited virtual community identifier indicating the hierarchical structure of each VPC, acquired from the at least one communication device included in the first VPC and the second VPC.

The processor 730 may generate the hierarchical content name using the virtual community identifier of each of the first VPC and the second VPC, and the content name included in the at least one communication device included in the first VPC and the second VPC.

Also, the processor 730 may generate the virtual community identifier of each of the first VPC and the second VPC.

When the VPC includes the second VPC, the hierarchical content name may hierarchically include the virtual community identifier of each of the first VPC and the second VPC, and the content name included in the first VPC and the second VPC.

The processor 730 includes a security key generation module 732 and an association module 734.

The security key generation module 732 may generate a public key for the first VPC, and may generate a security key of the first VPC based on the generated public key.

When the corresponding communication device corresponds to a communication device of a member included in the second VPC, a third VPC, or a fourth VPC, the communication device may generate a public key and a security key for the corresponding VPC.

Also, the security key generation module 732 may provide the public key or the security key to a member desiring an association with the corresponding communication device, among members of the second VPC or the third VPC.

The association module 734 may perform a self-secure association with another communication device of the first VPC, using the security key.

The association module 734 may perform an association between the corresponding communication device and the member desiring the association with the corresponding communication device, using the public key or the security key provided to the member by the security key generation module 732.

Thus, when a member of one of the hierarchical or non-hierarchical VPCs, for example, the first VPC, the second VPC, the third VPC, the fourth PVC, and the like, desires to perform an association with the corresponding communication device, the communication device may perform the association using the public key or the security key provided by the security key generation module 732.

The member included in the community having performed the association with the corresponding communication device may automatically perform the association with all members of the VPC including the corresponding communication device and thus, the member may not further perform the association.

The memory 750 may store the virtual community identifier, and the hierarchical content name.

Also, the memory 750 may store the public key and the security key generated by the security key generation module 732, and the processor 730 may provide the stored the public key and the security key to a member desiring the association with the corresponding communication device.

Figure 8:
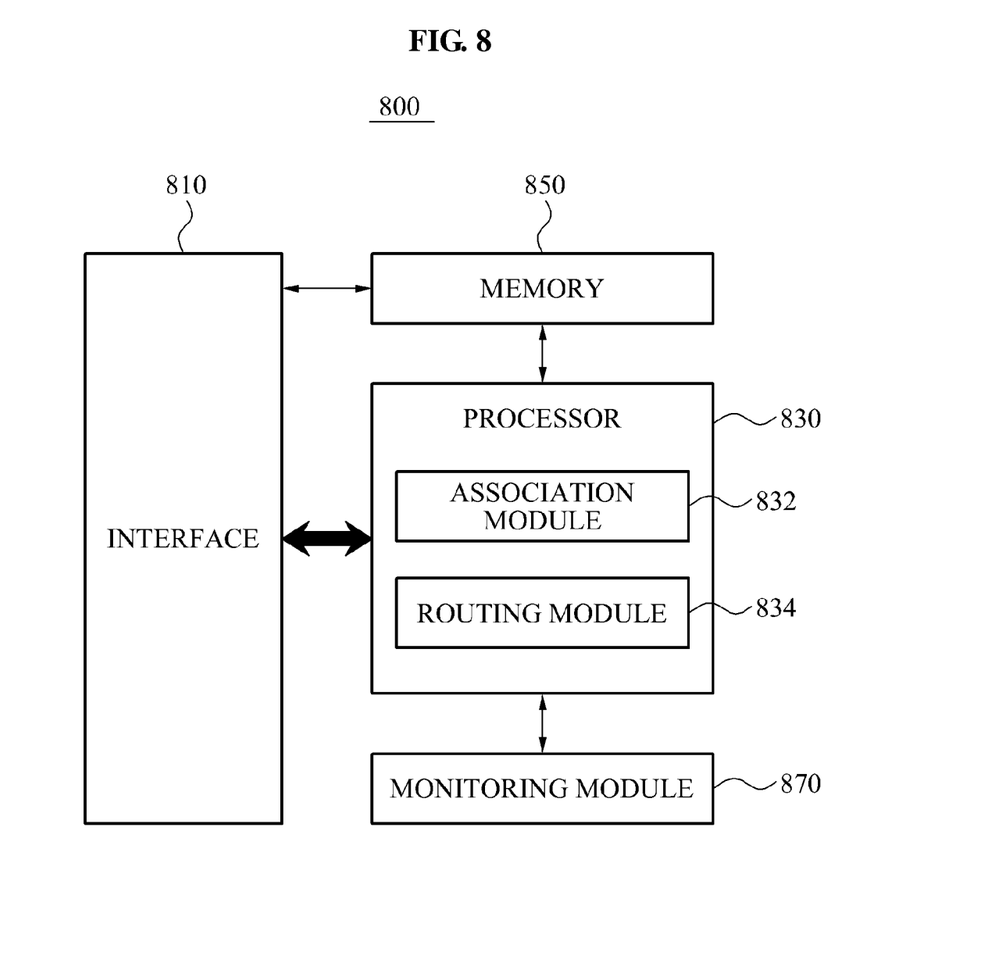
FIG. 8 is a block diagram illustrating an example of a hub for a communication device in a VPC.

FIG. 8 illustrates an example of a hub 800 for a communication device in a VPC.

Referring to FIG. 8, the hub 800 includes an interface 810, a processor 830, and a memory 850.

The hub 800 further includes a monitoring module 870.

The VPC may include a first VPC for a predetermined user, including communication devices of the predetermined user, and a second VPC corresponding to a higher order community of the first VPC.

In this instance, members of the second VPC may share a content sharing service or social networking service.

The interface 810 may receive an inherited virtual community identifier indicating a hierarchical structure of each VPC, acquired from at least one communication device included in the first VPC and the second VPC.

The interface 810 may transmit, via an authorized channel, a public key for enabling the members of the second VPC to recognize the hub 800 to members of the second VPC.

Also, the interface 810 may exchange at least one piece of communication environment information with other VPCs outside of the second VPC in order to perform a communication with the other VPCs.

In this instance, the at least one piece of communication environment information may include information about a virtual community identifier and contents included in the member of the VPC.

The processor 830 may process a content request message from the at least one communication device, using a hierarchical content name.

The processor 830 further includes an association module 832 and a routing module 834.

The association module 832 may perform an association with a communication device including the contents, using the virtual community identifier of each of the first VPC and the second VPC.

The routing module 834 may generate a routing path between the communication device including the contents and a communication device requesting the contents, using the virtual community identifier.

The processor 830 may perform at least one of synchronization, push, and a content search, with the members of the second VPC.

The processor 830 may manage information about the members of the second VPC, and information about the contents included in the members of the second VPC.

The memory 850 may store the virtual community identifier.

The monitoring module 870 may periodically or aperiodically detect a change in the contents included in the members of the second VPC.

When a change in the contents is detected by the monitoring module 870, the processor 830 may acquire the changed contents from the members of the second VPC, or may enable the members of the second VPC to share the changed contents.

The monitoring module 870 may be included in the processor 830.

In addition, the VPC may further include a third VPC corresponding to a higher community of the plurality of second VPCs.

Here, members of the third VPC may perform an association through a predetermined communication device, and may share information about each of the plurality of second VPCs.

When the VPC includes the third VPC, the interface 810 may receive a hierarchical content name including an inherited virtual community identifier indicating a hierarchical structure of each VPC.

Here, the hierarchical content name including the inherited virtual community identifier may be acquired from at least one communication device included in the first VPC, the second VPC, and the third VPC.

Figure 9:
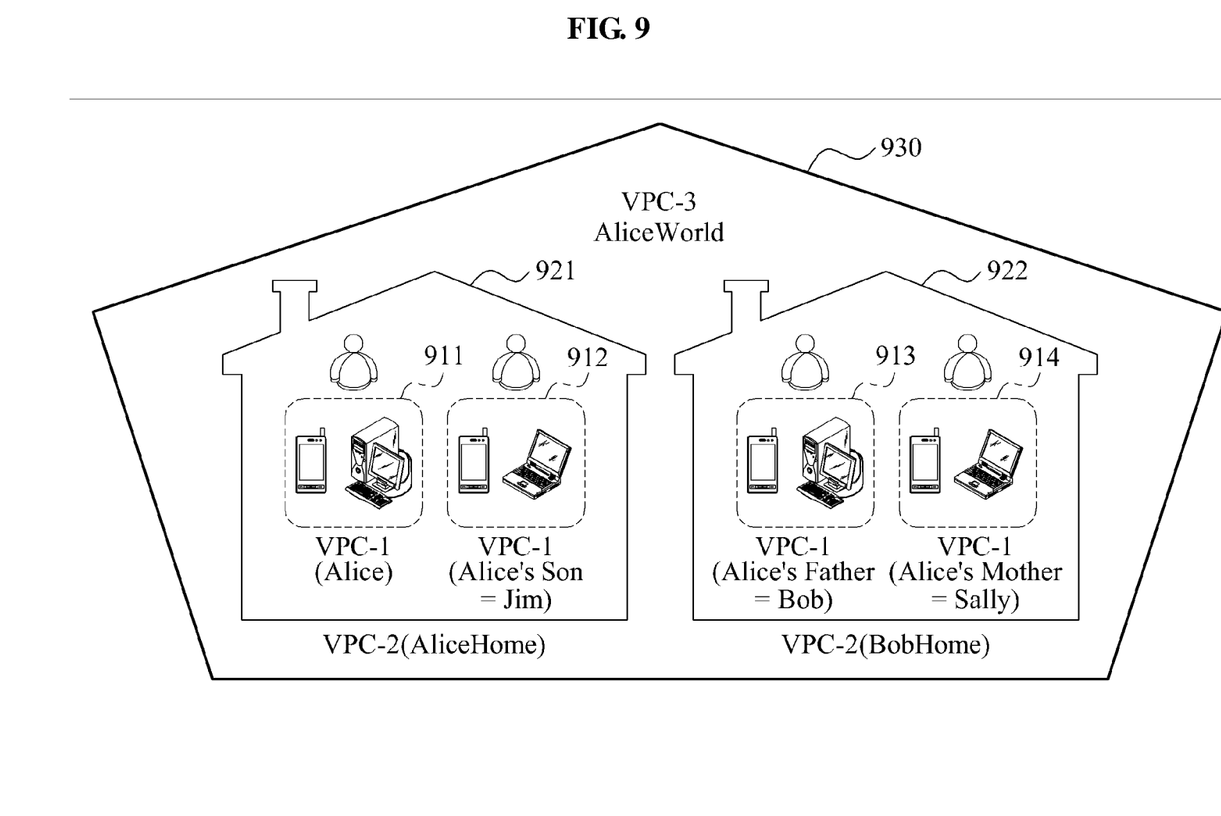
FIG. 9 is a diagram illustrating an example of a VPC network for describing an example of searching for a member or contents.

FIG. 9 illustrates an example of a VPC network for describing an example of searching for a member or contents.

Referring to FIG. 9, the VPC network includes multiple VPCs including users such as 'Alice', 'Jim', 'Bob', and 'Sally', and the VPCs have a hierarchical structure.

That is, communication devices owned by 'Alice' form a first VPC, VPC-1 911, and communication devices owned by 'Jim' form another first VPC, VPC-1 912. Also, communication devices owned by 'Bob' form still another first VPC, VPC-1 913, and communication devices owned by 'Sally' form a further first VPC, VPC-1 914.

Further, the VPC-1 911 of 'Alice', and the VPC-1 912 of 'Jim' form a second VPC, VPC-2 921 that is positioned in an upper layer, and the VPC-1 913 of 'Bob', and the VPC-1 914 of 'Sally' form a second VPC, VPC-2 922 that is positioned in an upper layer.

Also, the VPC-2 921 of 'Alice', and the VPC-2 922 of 'Sally' form a third VPC, VPC-3 930.

As aforementioned, VPC identifiers assigned to the VPCs may indicate a hierarchical structure among the VPCs. For example, the VPC identifiers may be indicated as follows.

Third VPC, VPC-3 930: [AliceWorld]
Second VPC of 'Alice', VPC-2 921: [AliceWorld/AliceHome]
Second VPC of 'Bob', VPC-2 922: [AliceWorld/BobHome]
First VPC of 'Alice', VPC-1 911: [AliceWorld/AliceHome/Alice]
First VPC of 'Jim', VPC-1 912: [AliceWorld/AliceHome/Jim]
First VPC of 'Bob', VPC-1 913: [AliceWorld/BobHome/Bob]
First VPC of 'Sally', VPC-1 914): [AliceWorld/BobHome/Sally]

As aforementioned, the VPC identifiers of the VPCs may indicate the hierarchical structure among the VPCs. That is, users may verify in which layer a predetermined VPC is included in the VPC network, by referring to a VPC identifier of the predetermined VPC only.

An example in which 'Bob' or 'Sally' searches for a VPC, a user, that is, a member, or contents in the VPC-3 930 will be described hereinafter.

When 'Bob' or 'Sally' desires to search for a VPC, a user, that is, a member, or contents in the VPC-3 930, 'Bob' or 'Sally' may transmit a search request. In this instance, 'Bob' or 'Sally' may transmit a search request including one of VPC identifiers.

For example, the search request may include one of [AliceWorld], [AliceWorld/AliceHome], [AliceWorld/BobHome], [AliceWorld/AliceHome/Alice], [AliceWorld/AliceHome/Jim], [AliceWorld/BobHome/Bob], and [AliceWorld/BobHome/Sally]. When the user is unaware of the uppermost identifier [AliceWorld], the user may be able to search [AliceWorld].

When the search request transmitted from 'Bob' or 'Sally' includes [AliceWorld], generators of the VPCs positioned in a lower layer of the VPC-3 930, that is, the VPC-2 921 of 'Alice' and the VPC-2 922 of 'Bob' may response to the search request. The generators of the VPC-2 921 of 'Alice' and the VPC-2 922 of 'Bob' may correspond to 'Alice' and 'Bob', and accordingly 'Alice' and 'Bob' may respond to the search request.

In this instance, 'Alice' and 'Bob' may respond to the search request by incorporating {AliceHome} and {BobHome} in a form of data into the search request [AliceWorld]. Accordingly, 'Bob' or 'Sally' may be aware that {AliceHome} and {BobHome} exist in a lower layer of [AliceWorld], based on the response from 'Alice' and 'Bob'.

When the search request transmitted from 'Bob' or 'Sally' includes [AliceWorld/AliceHome], 'Alice' corresponding to a generator of the VPC-1 911 of 'Alice', and 'Jim' corresponding to a generator of the VPC-1 912 of 'Jim' may response to the search request. Here, the VPC-1 911 of 'Alice' and the VPC-a 912 of 'Jim' may be is positioned in the lower layer of the VPC-2 921 of 'Alice'. In this instance, 'Alice' and Jim' may respond to the search request by incorporating {AliceHome, BobHome} in a form of data into the search request. Accordingly, 'Bob' or 'Sally' may be aware that the VPC-1 911 of 'Alice' and the VPC-1 912 of 'Jim' exist in a lower layer of {AliceWorld/AliceHome}, based on the response from 'Alice' and 'Bob'.

When the search request transmitted from 'Bob' or 'Sally' includes [AliceWorld/AliceHome/Alice], the VPC-1 911 of 'Alice' may be verified. In this instance, the communication devices included in the VPC-1 911 of 'Alice' may transmit a list of contents owned by the communication devices. Accordingly, 'Bob' or 'Sally' may verify the list of contents owned by the communication devices included in the VPC-1 911 of 'Alice. Also, 'Bob' or 'Sally' may request for desired contents based on the list of contents.

In particular, VPC identifiers of VPCs, as well as contents may also have hierarchical content names reflecting a hierarchical structure. This has been described above, and accordingly a further description will be omitted.

'Bob' or 'Sally' may properly determine scope of a search in the VPC network having the hierarchical structure. That is, 'Bob' or 'Sally' may incorporate information about the scope of the search into the search request, thereby instructing 'Alice' or 'Jim' to respond to the search request in accordance with the corresponding scope.

For example, it may be assumed that 'Bob' or 'Sally' transmits s a search request, such as 'AliceWorld/AliceHome 2 depth'. Here, 'AliceWorld/AliceHome' may indicate a VPC identifier of the VPC-2 921 of 'Alice', and '2 depth' may indicate information about scope of the search.

'Alice' corresponding to the generator of the VPC-1 911 of 'Alice', and 'Jim' corresponding to the generator of the VPC-1 912 of 'Jim' may respond to the search request. In this instance, since the information about the scope of the search corresponds to '2 depth', 'Alice' and 'Jim' may transmit a list of contents owned by each of 'Alice' and 'Jim'. When the information about the scope of the search corresponds to '1 depth', 'Alice' and 'Jim' may respond to the search request by incorporating {Alice} and {Jim} into the search request in a form of data.

Here, the scope of the search may be variously determined. That is, the scope of the search may be determined to be a value ranging from '1 depth' to n depth'. A value of 'k depth', among values ranging from '1 depth' to 'n depth', may be determined to be a basic value. When the information about the scope is null, and the information may correspond to 'k depth'.

According to an aspect, by generating a user-oriented VPC based on a communication device of a person, for example, a member, the VPC may be easily generated without help from an external service provider or external server.

According to another aspect, by generating a user-oriented virtual private community, a leak of personal information by an external service provider or external server may be prevented.

According to still another aspect, by generating a user-oriented virtual private community based on a user-oriented distributed structure, various services such as a social networking service, content sharing service, and the like may be more easily provided to members of the community.

According to a yet aspect, by generating a hierarchical content name using a content name and an inherited virtual community identifier indicating a hierarchical structure of a VPC, path setting and routing may be more easily performed in the VPC.

According to further another aspect, by generating a non-virtual private community among predetermined members independent of a boundary of a hierarchical VPC, a separate access authority and security setting conforming to the non-virtual private community may be provided.

According to still another aspect, by performing a self-secure association using a public key and a security key in a VPC, an association between members in the community, and an association with members outside of the community may be easily performed.

According to still another aspect, by performing a self-secure association, a hierarchical VPC or non-virtual private community may be easily generated, and scalability of a VPC may be easily performed.

According to still another aspect, technology for efficiently searching for a member or contents among VPCs that exist hierarchically may be provided.

The processes, functions, methods and/or software described above including methods according to example embodiments may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A member or content search method in a virtual private community (VPC) network comprising at least one of a first VPC including communication devices owned by a predetermined user, a second VPC that is positioned in an upper layer of the first VPC, and a third VPC that is positioned in an upper layer of the second VPC, the method comprising:
    receiving, by one of the communication devices, a search request comprising one of VPC identifiers from a user;
    verifying a VPC corresponding to the VPC identifiers that are included in the search request, in response to the search request;
    searching for members included in the verified VPC, a VPC positioned in a lower layer of the verified VPC, or contents owned by the members included in the verified VPC,
    wherein the VPC identifiers of the VPCs indicate a hierarchical structure among the VPCs;
    responding to the search request by incorporating a portion of the VPC identifiers of the first VPC into the search request,
    wherein the receiving comprises receiving a search request including VPC identifiers of the second VPC,
    the verifying comprises verifying the second VPC, and;
    the searching comprises searching for the first VPC that is positioned in a lower layer of the second VPC.

2. A non-transitory computer-readable medium comprising a program for instructing a computer to perform the method of claim 1.

3. A communication device in a virtual private community (VPC) network comprising at least one of a first VPC including communication devices owned by a predetermined user, a second VPC that is positioned in an upper layer of the first VPC, and a third VPC that is positioned in an upper layer of the second VPC, the communication device comprising:
    a memory to store VPC identifiers of the VPCs, indicating a hierarchical structure among the VPCs;
    an interface to receive a search request comprising one of the VPC identifiers; and a processor to verify a VPC corresponding to the VPC identifiers that are included in the search request, in response to the search request, and to search for members included in the verified VPC, a VPC positioned in a lower layer of the verified VPC, or contents owned by the members included in the verified VPC.

4. The method of claim 1, further comprising:
responding to the search request by incorporating the search result into the search request.

5. The method of claim 1, further comprising:
responding to the search request by incorporating a portion of the VPC identifiers of the second VPC into the search request,
wherein the receiving comprises receiving a search request including VPC identifiers of the third VPC,
the verifying comprises verifying the third VPC, and
the searching comprises searching for the second VPC among the first VPC and the second VPC positioned in a lower layer of the third VPC.

6. The method of claim 1, further comprising:
responding to the search request by incorporating a list of the contents owned by communication devices included in the first VPC into the search request,
wherein the receiving comprises receiving a search request including VPC identifiers of the first VPC,
the verifying comprises verifying the first VPC, and
the searching comprises searching for the communication devices included in the first VPC.

7. The method of claim 1, wherein a hierarchical content name of the contents owned by the communication devices comprises VPC identifiers of the first VPC, and a name of the contents owned by the communication devices.

8. The method of claim 1, wherein members of the second VPC share a content sharing service or a social networking service.

9. The method of claim 1, wherein members of the third VPC perform an association using a predetermined communication device, and share information about each of a plurality of second VPCs.

10. The method of claim 1, wherein the receiving comprises receiving, by at least one of the communication devices, a search request including one of the VPC identifiers, and information about a scope of a search.

11. The method of claim 10, wherein the verifying comprises verifying one of the first VPC, the second VPC, and the third VPC based on the information about the scope of a search.

* * * * *